A. H. TRUEBLOOD.
MASKS FOR HORSES AND CATTLE.
No. 193,055. Patented July 10, 1877.
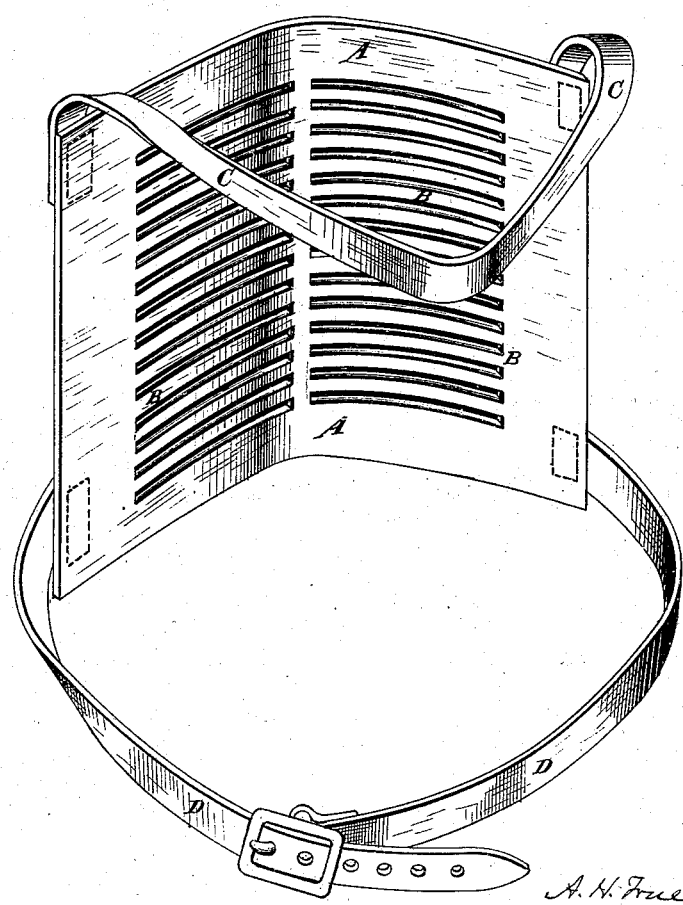

UNITED STATES PATENT OFFICE.

ALBERT H. TRUEBLOOD, OF DENISON, TEXAS.

IMPROVEMENT IN MASKS FOR HORSES AND CATTLE.

Specification forming part of Letters Patent No. 193,055, dated July 10, 1877; application filed December 20, 1876.

*To all whom it may concern:*

Be it known that I, ALBERT HENRY TRUEBLOOD, of Denison, in the county of Grayson and State of Texas, have invented a new and useful Mask for Horses, Cattle, &c., of which the following is a specification:

The object of my invention is to prevent horses, mules, and cattle from jumping fences. Many barbarous contrivances have been employed for this purpose which are painfully inconvenient for the animal wearing the same. This mask, covering the eyes of the animal, leaves him with a sufficiently free vision, and, being thoroughly ventilated, will not injure his eyes. At the same time the cross-bars and opening give such an alternation of light and darkness that the animal cannot distinguish which is the fence, nor judge of its height. He will, therefore, not attempt to jump it.

In the annexed drawings, which make part of this specification, the blind is represented in perspective.

It consists of a piece of leather or other suitable flexible material, A, having a series of horizontal slits, B B, for the passage of light, disposed in front of each of the eyes of the animal, with intervening solid portions of the material. A strap, C, is intended to pass over the head behind the ears, and another strap, D, is buckled under the throat.

What I claim as my invention, and desire to secure by Letters Patent, is—

A mask for animals, formed of the slitted piece A B, with straps for securing it in front of their eyes, substantially as set forth.

In testimony whereof I have signed my name to this specification in the presence of two subscribing witnesses.

ALBERT HENRY TRUEBLOOD.

Witnesses:
J. B. KELLY,
WILLIAM O'BRIEN.